United States Patent [19]

Hocker et al.

[11] Patent Number: 5,801,699
[45] Date of Patent: Sep. 1, 1998

[54] ICON AGGREGATION ON A GRAPHICAL USER INTERFACE

[75] Inventors: Michael David Hocker, Staatsburg; Neal Martin Keller, Hartsdale, both of N.Y.; James Gordon McLean, Fuquay-Varina, N.C.; Clifford Alan Pickover, Yorktown Heights, N.Y.; Daniel James Winarski, Tucson, Ariz.

[73] Assignee: International Business Machines Corporation, Armonk, N.Y.

[21] Appl. No.: 592,250

[22] Filed: Jan. 26, 1996

[51] Int. Cl.⁶ ........................................ G06F 3/14
[52] U.S. Cl. .............................. 345/348; 345/340
[58] Field of Search ............................ 395/348, 349, 395/340, 339, 356, 333, 335, 326, 327, 334

[56] References Cited

U.S. PATENT DOCUMENTS

| | | | |
|---|---|---|---|
| 5,404,439 | 4/1995 | Moran et al. | 395/348 |
| 5,421,015 | 5/1995 | Khoyi et al. | 395/650 |
| 5,442,746 | 8/1995 | Barrett | 395/340 |
| 5,535,403 | 7/1996 | Li et al. | 395/800 |
| 5,544,295 | 8/1996 | Capps | 395/340 |
| 5,550,969 | 8/1996 | Tones et al. | 395/348 |
| 5,564,004 | 10/1996 | Grossman et al. | 395/348 |
| 5,570,281 | 10/1996 | Berry | 364/146 |
| 5,598,557 | 1/1997 | Doner et al. | 395/605 |

*Primary Examiner*—Raymond J. Bayerl
*Assistant Examiner*—Steven P. Sax
*Attorney, Agent, or Firm*—Louis J. Percello

[57] ABSTRACT

Using a graphical user interface (GUI), users manipulate, organize, classify, and/or arrange icons by having the icons bind (stick) to one another and be moved as aggregates. Icons sticky sites may be on icons, windows, or other graphical objects. For example, when an icon with a sticky site is dragged close to another icon with a sticky site, the icons bind together and are subsequently moved as one graphical unit. In some embodiments, a visual indication or binding is given. The icons may be unbound by pointing to an unbinder icon, or using a button sequence on the mouse of keyboard.

14 Claims, 8 Drawing Sheets

BINDING OF ICONS

|   | 1 | 2 | 3 | 4 | 5 | 6 |
|---|---|---|---|---|---|---|
| 1 | 1 | 0 | 0 | 1 | 1 | 0 |
| 2 | 0 | 1 | 0 | 0 | 0 | 0 |
| 3 | 0 | 0 | 1 | 0 | 0 | 0 |
| 4 | 1 | 0 | 0 | 1 | 1 | 0 |
| 5 | 1 | 0 | 0 | 1 | 1 | 0 |
| 6 | 0 | 0 | 0 | 0 | 0 | 1 |

CONNECTIVITY TABLE

FIG. 7

|   |    |    |    |    |
|---|----|----|----|----|
| 1 | XY | XY | XY | XY |
| 2 | XY | XY | XY | XY |
| 3 | XY | XY | XY | XY |

FIG. 8

ICONS IN A GROUP

ICON AGGREGATION ON A GRAPHICAL USER INTERFACE

FIELD OF THE INVENTION

This invention relates to computer graphical user interfaces. More specifically, the invention relates to a graphical user interface (GUI) allowing users to consolidate and move icons displayed on a computer screen.

BACKGROUND OF THE INVENTION

Graphical user interfaces (GUIs) provide ways for users of computers and other devices to effectively communicate with the computer. In GUIs, available applications and data sets are often represented by icons comprising small graphical representations which can be selected by a user and moved on the screen. The selection of icons often takes the place of typing in a command using a keyboard in order to initiate a program. In general, icons are tiny on-screen symbols that simplify functions like the access to a program, command, or data file. Icons are usually activated or selected by moving a mouse-controlled cursor onto the icon and pressing a mouse button.

GUIs include graphical images on computer monitors and often consist of both icons and windows. (GUIs may also reside on the screens of televisions, kiosks, and automatic teller machines (ATMs). A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. A typical user's screen contains many icons.

As graphical user interfaces (GUIs) become both more common and more complex, the need to effectively manage and manipulate graphical elements (icons) within the user interface becomes greater. Desktop and folder elements within a GUI typically contain many icons, which can be sorted based on name, creation date, or other fixed attributes. However, this sorting ability does not make it easy or even possible for the user to group or organize icons as desired, if the desired grouping falls outside of one of the sort options.

OBJECTS OF THE INVENTION

An object of this invention is an improved system and method for managing, manipulating, organizing, classifying, and/or accessing icons and/or windows on a computer system.

SUMMARY OF THE INVENTION

Using a graphical user interface (GUI), users manipulate, group, classify, organize and/or arrange icons by creating clusters of icons (windows), e.g., with common characteristics and/or relationships. Using "sticky sites," two or more icons bind (stick) to one another when they are within a threshold distance of one another. Once bound together, all the icons in the cluster move together as a single graphical object. Icon sticky sites may be on icons, windows, or other graphical objects. A visual indication of binding can be given. The icons also may be unbound, e.g., by pointing to an unbinding (desticking) icon or by using button sequence on a mouse or keyboard.

BRIEF DESCRIPTION OF THE DRAWINGS

FIG. 7 is a block diagram of a data structure that defines connectivity of icons.

FIG. 8 is a block diagram of a data structure that defines positions of sticky sites on graphical objects such as icons.

DETAILED DESCRIPTION OF THE INVENTION

This invention permits users to use graphical objects, e.g., icons and windows using sticky binding sites. A sticky binding site is a location on a graphical object to which other graphical objects on a GUI are attached. These graphical objects can be represented on the GUI by one or more GUI objects 161 that include: icons 161 with static or animated graphics, text, multimedia presentations, and windows displaying TV broadcasts. GUI objects 161 could also include three dimensional images, for example, those used in virtual reality applications. In a preferred embodiment, an icons may be dragged to another icon so that both icons stick to one another and are treated as a single graphical object and/or functional unit.

Figure 1:
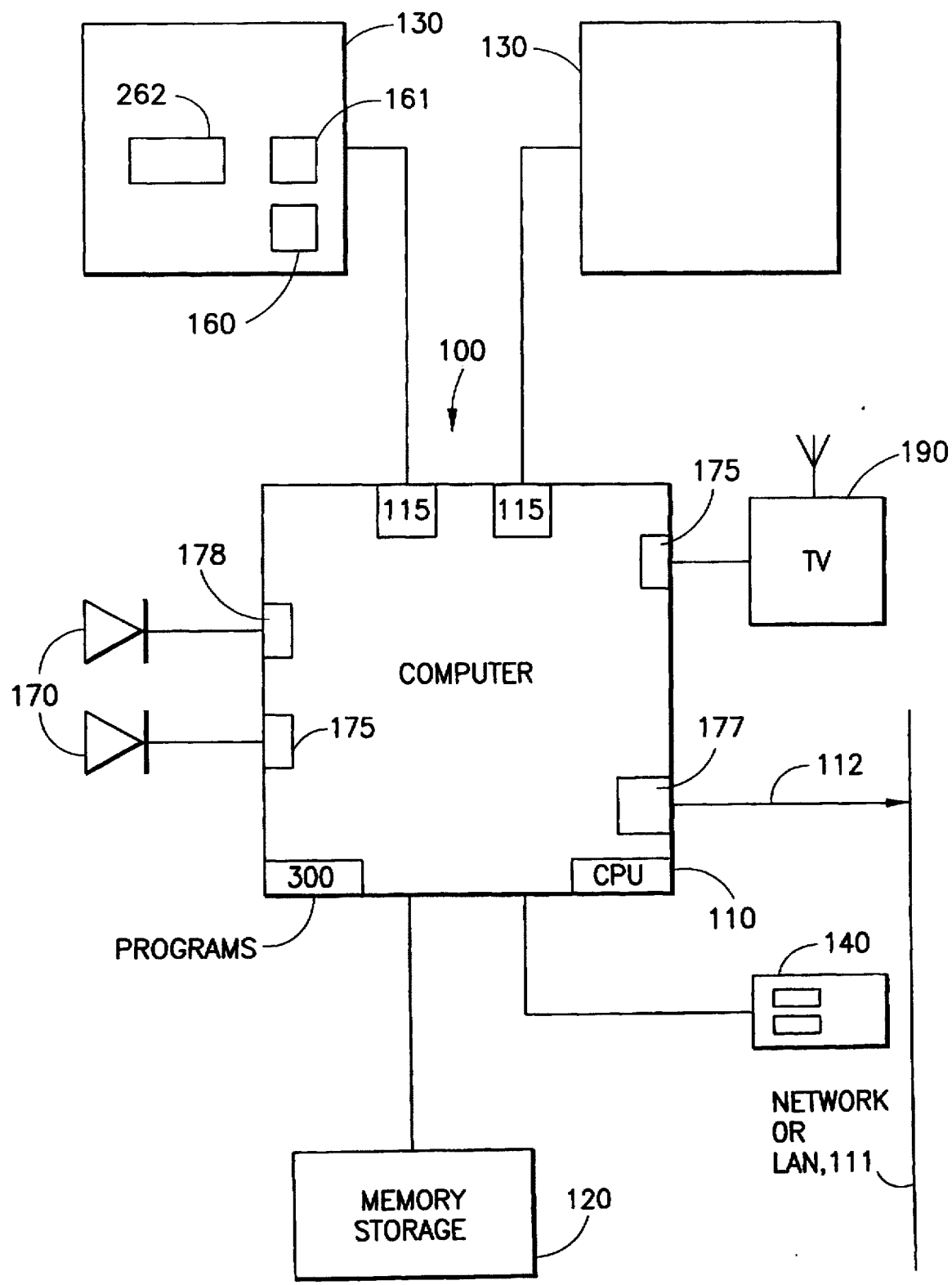
FIG. 1 is a block diagram of one preferred system embodiment of the present invention.

The present invention is capable of running on any general purpose computer system or computer controlled GUI (e.g. a television or virtual reality system), including GUIs that have the ability to present multimedia and/or virtual reality system), information. One preferred embodiment is schematically represented in a block diagram in FIG. 1. A computer system 100 comprises a central processing unit (CPU) 110, memory storage device 120, one or more monitors or graphical interfaces 130, and selection device 140 such as a mouse or speech recognition system 178. In one embodiment, an IBM RISC SYSTEM/6000 100 comprises a central processing unit (CPU) 110, memory storage device 120, one or more monitors 130, and a mouse 140. The mouse 140 may be used to select GUI objects 161, like icons 161. (Note that icons 161 include target icons 262 and initiator icons 160 described below.) On an IBM RISC System/6000 multiple monitors 130 can be controlled by multiple monitor adaptor cards 115 such as the IBM RISC System/6000 Color Graphics Display Adaptor. The computer system 100 may also have audio input/output capability 170. An ActionMedia II Display Adapter 175 (described in the IBM ActionMedia II Technical Reference) can be used for audio/video playback 170.

This adaptor 175 may also be used to display TV broadcasts/signals 190, e.g. "picture-in-picture" of TV broadcasts, and other full motion video and sound audio/visual on the monitors 130.

In addition, speech synthesis or speech recognition 178 may be provided. Speech recognition may take place using a IBM Voice Type Dictation adapter.

In an alternative embodiment, the CPU 110 can be connected 112 via a network adaptor 177 to connect the system 100 to the network 111. Network adaptors 177 are well known. Three examples 177 include token ring adaptors, ethernet adaptors, and modems. The system 100 can be connected to other target monitors 130 through a client/server network (or LAN 111).

Systems that can be used to display graphical images, like icons and windows, are well known.

GUIs can be used to control any apparatus having a monitor. In the field of television (TV), channel selection can be performed by selecting an icon consisting of the animated video broadcast on a given channel frequency.

Figure 2:
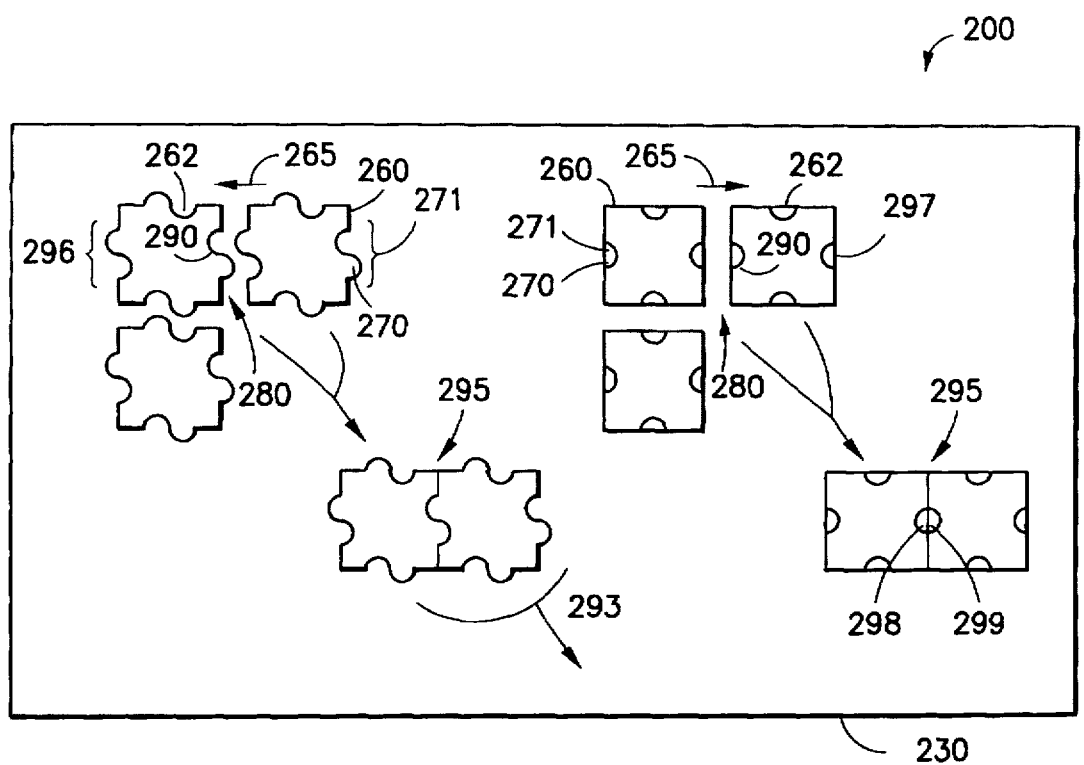
FIG. 2 is a drawing of a GUI displaying initiator icons and target icons.

FIG. 2 is a block diagram of a GUI 230 with icons 161 (see FIG. 1) including target icons 262 (optional) and initiator icons 260. The target and initiator icons contain graphical indicators 270 of sticky sites 271. The user uses a selection device (mouse) 140 to select an initiator icon 260 and drags 265 the initiator icon to target icons 262. If the initiator icon's sticky site 270 is close (within a threshold distance 280) to a target icon's sticky site 290, then the two icons are bound (stuck) 295 together and may be moved as a single unit (i.e., a single graphical object/image) using the mouse.

"Closeness" is determined by computing the distances from the sticky sites on the selected icon to all other sticky sites on the GUI. If the distance is smaller than a particular threshold 280, the icons are close. The locations of all sites are contained in a table stored in memory or on disk, as described later (FIG. 8). In one preferred embodiment, the sticky sites 270 are graphically depicted by a jigsaw puzzle like feature 296 or other figure such as a semicircle 297 so that when the sites are bound, there is a graphical indication 297 of the binding to the user. For example, the semicircle 297 may join to form a circle 298 which becomes filled in or changes color 299. Once bound 295, the icons may be moved together 298 as a single unit (i.e., a single graphical object/image), e.g. by using a pointing device, such as the mouse 140.

Figure 3:
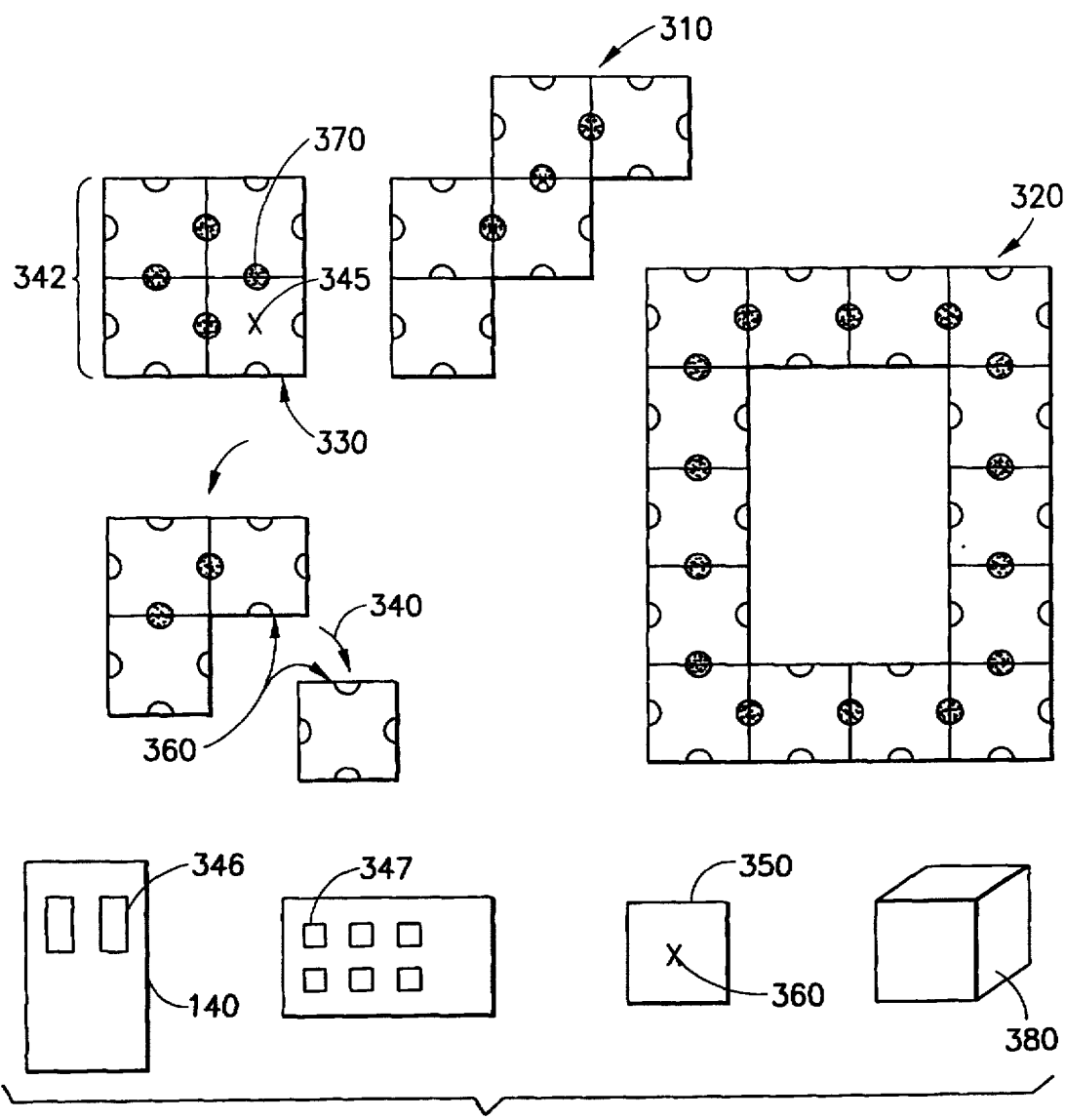
FIG. 3 is a drawing of a system with GUIs displaying alternative arrangements of icons.

FIG. 3 shows additional arrangements of icons which may bind to one another as a single unit. For example, they may form a zig-zag cluster 310, a block cluster 342, or a closed bounding region 320.

Once bound 295, an icon may be selected 330 and removed 340 from a cluster of icons, e.g. 342. A cluster (or group) of icons consists of two or more icons that are bound and behave as a single unit. Removal of an icon may be accomplished by any of a plurality of means, for example by selecting the icon with a mouse-driven cursor 345 while pressing a particular mouse button 346 or keyboard button 347. The removal process may be under password control, that is, it may not take place without proper verification by the user. Verification may consist of typing a password using keyboard button(s) 347 or by any of a plurality of means. A de-sticking icon 350 may also be used to accomplish this task. For example, the user may select the de-sticking icon 350 with the cursor 360 and then select 330 the icon to be unstuck (i.e. removed 340) from the cluster 342. Alternatively, the desticking icon 350 can be dragged over the icon(s) to be unstuck. Note that when the icon is removed 340, the graphical indication of stickiness 360 (see 296 and 297 in FIG. 2) changes, in this example, from a darkened circle 370 to two empty half-circles 360. Note that graphical objects (icons, windows etc) may be three-dimensional objects 380 in a virtual reality or other three-dimensional GUI.

Figure 4:
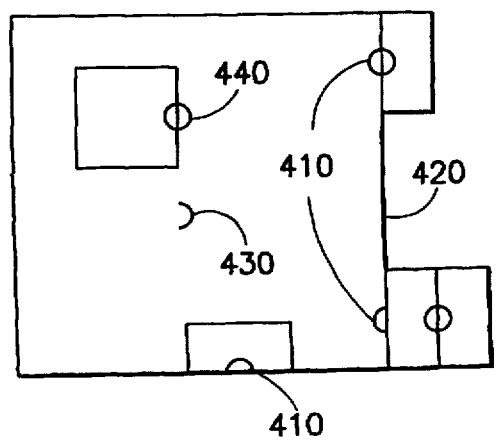
FIG. 4 is a drawing of a system with GUIs displaying alternative arrangements of icons and windows.

FIG. 4 shows additional arrangements of icons which may bind, with particular attention to icons interacting with windows. For example, the icons may bind to sticky sites 410 on a window 420. Sticky sites 430 may also reside in the interior of windows and be initially unattached to icons. These sites are henceforth referred to as "naked sites". Icons and windows may stick at these sites 440.

Figure 5:
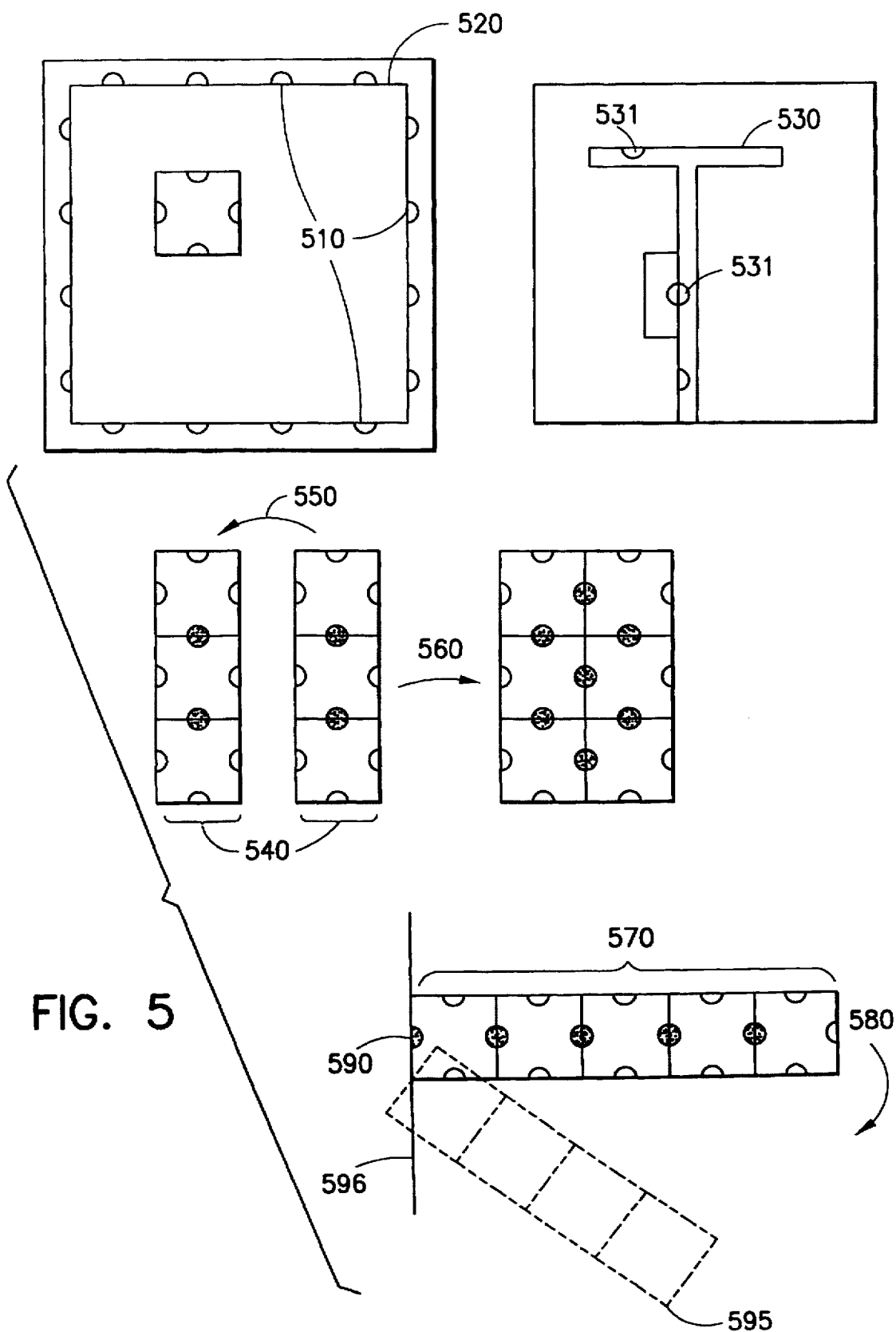
FIG. 5 is a drawing of a system with GUIs displaying alternative arrangements of icons and windows.

FIG. 5 shows additional arrangements of icons and sticky sites. For example, the sticky sites 510 may form a convenient sticky boundary, e.g. a border, of the entire display 520 (sometimes known as a "root window" for X-windows users.)

Also, various graphical objects 530 which are neither icons nor windows may contain sticky sites 531 to which icons may bind. This serves as a convenient "velcro storage rack" 530 for icons. The storage rack 530 might define specific attributes and/or relations that the stuck icons have in common and/or act as a way to organized/classify the icons stuck to the rack 530. As described in FIG. 3, removal from the storage rack 530 may take place using a mouse 140, or desticking icon 350, and be under password control. ("Velcro" is a trademark of Velcro Industries BV, the Netherlands/Holland Corporation.)

Note that entire clusters 540 may be stuck 560 to one another by dragging 550 one cluster close to the other cluster. To facilitate the use of icon clusters, such as cluster 570, the entire cluster may pivot 580 around a pivot point 590 to a new location 595. In this way, the cluster 570 may (for example) be conveniently stored at the side of the screen or window 596 until needed. Methods for pivoting graphical objects are well known to CADAM users.

Figure 6:
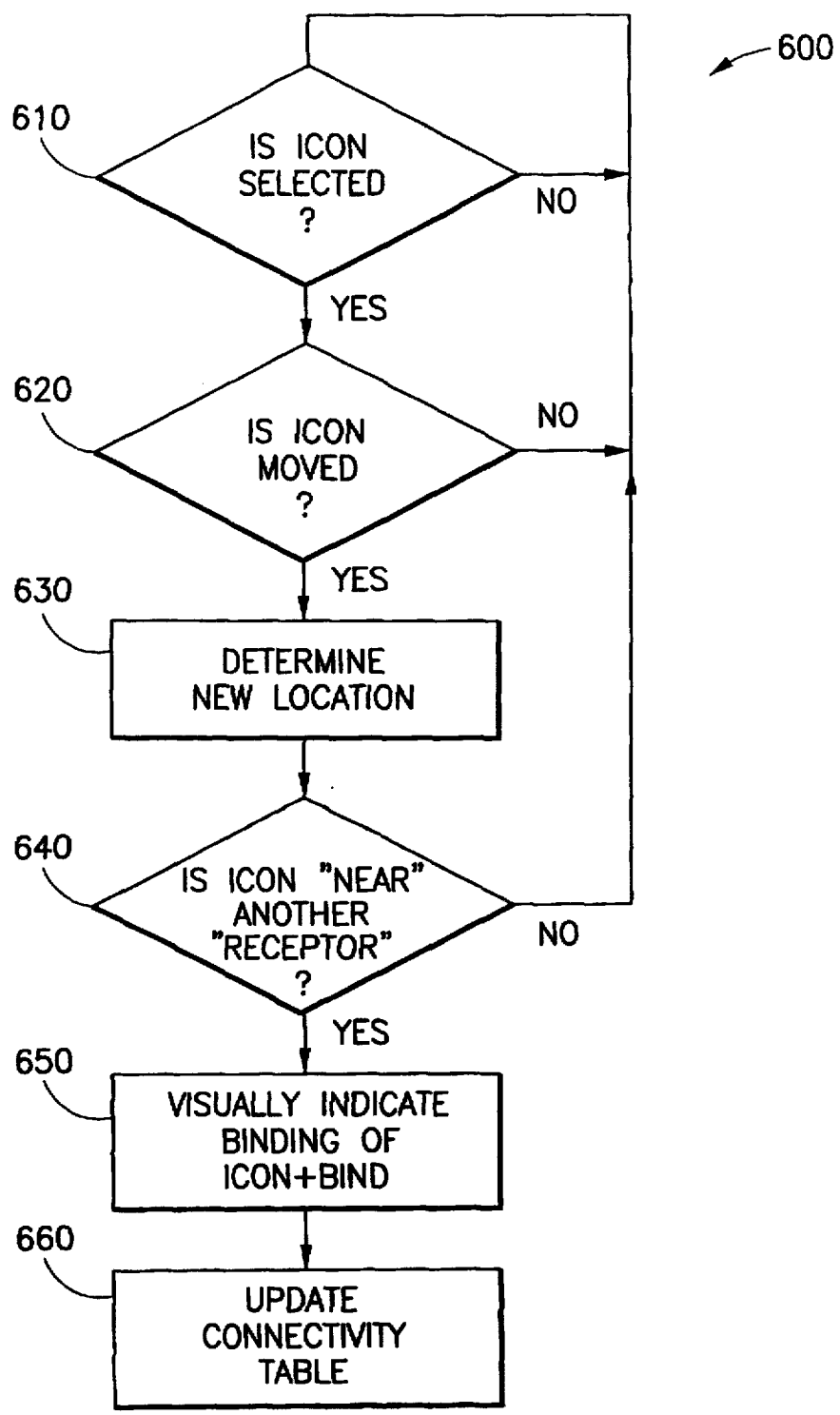
FIG. 6 is a flow chart showing the steps of one preferred method of site binding of the present invention.

FIG. 6 is a flow chart showing the steps 600 performed for a preferred version of binding icons executed by system 100.

In step 610, a program checks if an initiator icon 260 is selected. The selected icon 260 may be selected by any selection method: e.g., pointing and clicking or by an application program. If the icon is moved 620, its new location is determined 630. If the icon's stick site is near 640 another icon's, window's or "velcro storage rack's" sticky site, than a visual indication of binding is presented 650 and the icons are now bound.

As stated in the description for FIG. 2, the sticky sites 270 may be graphically depicted by a jigsaw puzzle like feature 296 or other figure such as a semicircle 297 so that when the sites are bound, there is a graphical (visual) indication of the binding to the user. For example, the semicircle 297 may join to form a circle 298 which becomes filled in or changes color 299.

As mentioned for FIG. 3, "nearness" or "closeness" is determined 640 by computing the distances from the sticky sites on the selected icon to all other sticky sites on the GUI.

In one preferred embodiment, distances are computed using known geometrical methods. For example, if (x1,y1) are the coordinates of sticky site 1 and (x2,y2) are the coordinates of sticky site 2, then the distance is $d=\sqrt{((x2-x1)^{}2+(y2-y1)^{}2)}$. This formula may be extended to include additional variables for higher dimensional spaces, such as in a virtual reality or three-dimensional environment.

A connectivity table on disk is updated 660 if the icon has become stuck. This table is described in the description for FIG. 7, and the table contains information on which icons are connected to each other.

FIG. 7 is a block diagram of one typical preferred data structure 700 that is used to contain alphanumerical names 710 for each icon containing binding sites. This example data file 700 contains information specifying which icons are bound (connected) 295 to one another. This is useful information, for example, when the system moves entire clusters of icons as a group when a single icon in the cluster is selected (see FIG. 9). For example, icon names 710 may be listed as the first entry of each row and column. Within the table 700, values at the intersection of the row and column representing icon names 710 indicate if the respective icons named are connected or not, e.g.: 1's indicate connectivity, 0's indicate no connectivity. For example, row 1 indicates that icon 1 is connected to icons 4 and 5 (and to itself). Software methods for scanning tables such as this are well known to those skilled in the art. In cases of "naked sites" a naked site name may be used in the table.

FIG. 8 is a block diagram of one typical preferred data structure 800 that contains information on the location of all sticky sites 531 and the icons, windows, or velcro storage rack(s) to which they are associated. For example, the first column may have an icon name 810. The next few entries specify the current location of the sticky sites on the icon. Locations may be stored as x 820 y 830 coordinate pairs. In a three-dimensional GUI, z coordinates may be added.

In the example block diagram in FIG. 8, line 1 contains the icon name 810 followed by four (x,y) pairs which may specify the locations of four different sticky sites on icon "1". Similarly, line 2 contains an icon name 810 followed by four (x,y) pairs which may specify the locations of four different sticky sites on icon "2". In these examples, each record therefore contains the icon name followed by (x,y) coordinates of all sticky sites on that icon. Similarly, the same record could be used for windows and storage racks where the name 810 references windows and storage racks. Additional coordinates may be used in three-dimensional or virtual reality environments. For example, the first record can be expanded to "1, x y z, x y z, x y z, x y z" to specify four three-dimensional locations of sticky sites on icon 1.

Figure 9:
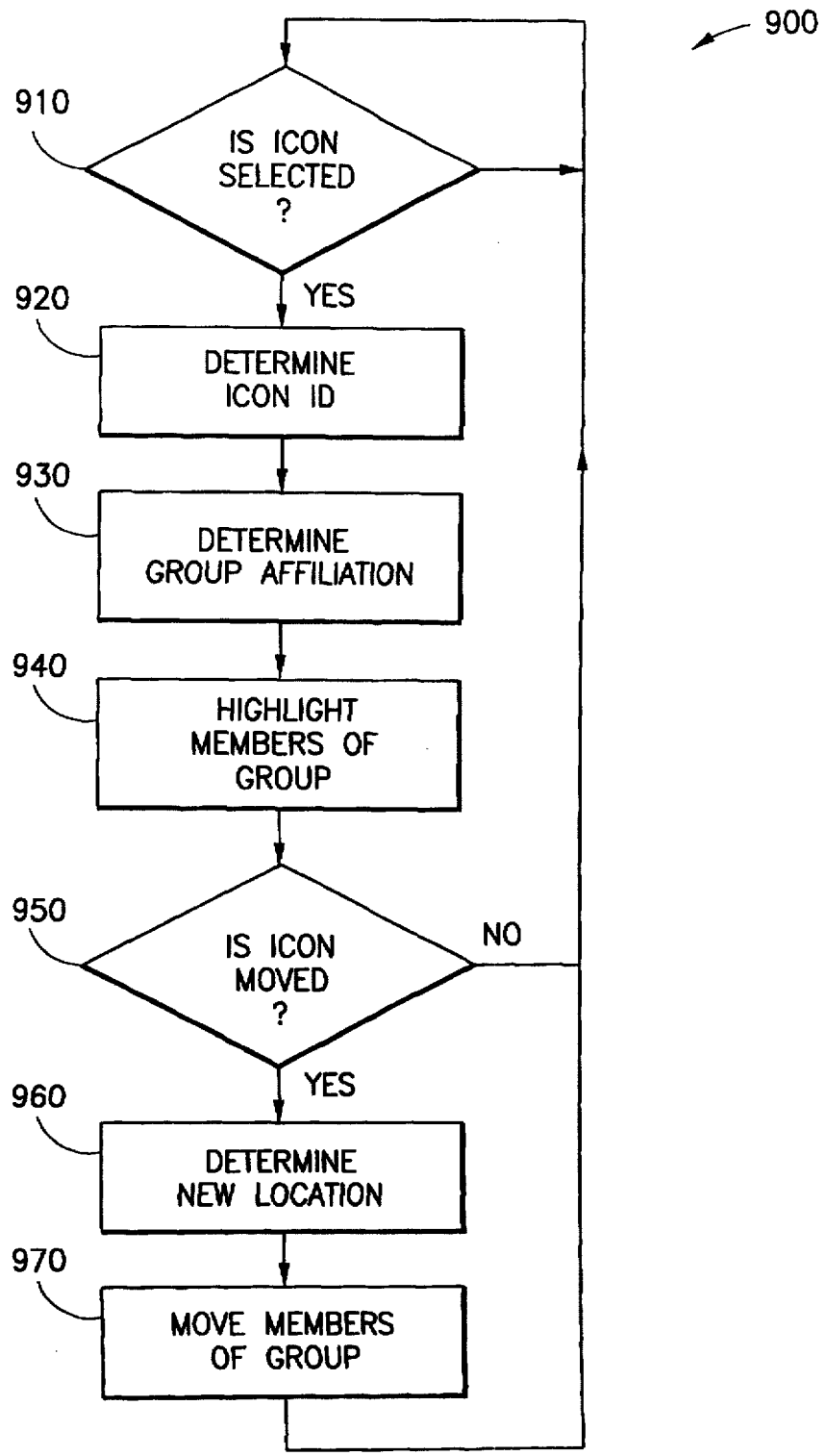
FIG. 9 is a flow chart showing the steps of one preferred method for moving icons in a cluster or group of the present invention.

FIG. 9 is a flow chart showing the steps 900 performed for a preferred method of moving icons in a cluster or group by system 100. If an icon is selected 910, its icon identification (alphanumeric label or name) 710, 810 is determined 920 using known GUI principles. Next its "group (cluster) affiliation" is determined 930. For example, group affiliation refers to all the members of a cluster as indicated by non-zero entries in a row of data table 700. All the members of the cluster or group may be optionally highlighted 940 when a single icon in the group is selected. If the icon selected in step 910 is moved 950 then the new location of the icon is determined 960. All the members of the group/cluster are moved together in step 970 to the new location. Thus, all the icons in the group/cluster move together as a single unit.

Figure 10:
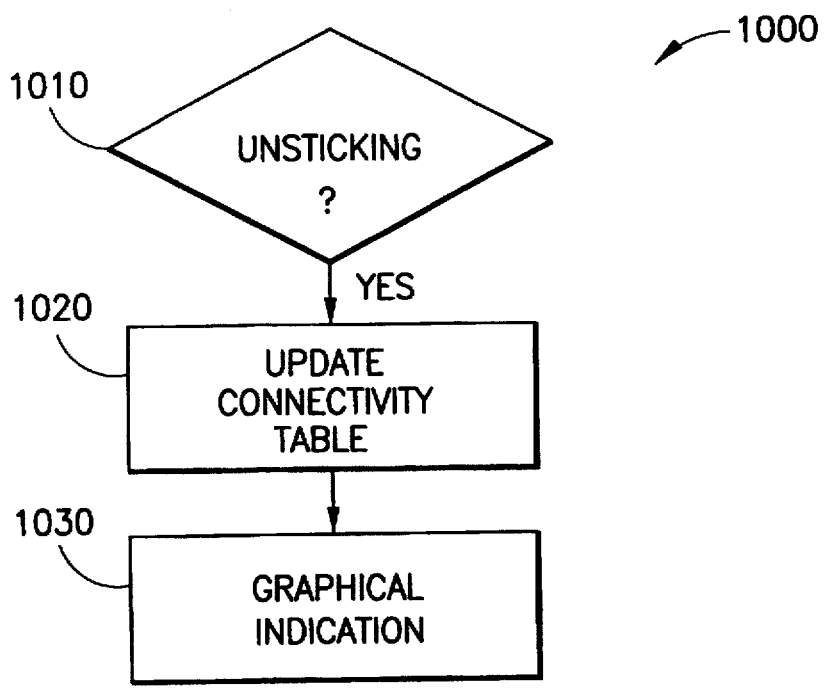
FIG. 10 is a flow chart showing the steps of one preferred method for unsticking icons.

FIG. 10 is a flow chart showing the steps 1000 performed for a preferred method of desticking icons in a cluster or group by system 100. Unsticking 1010 of an icon may be requested by pointing to that icon and then pressing a particular mouse or keyboard button, or by pointing to an unbinder (desticking) icon 350. The connectivity table 700 is updated 1020 (e.g. a 1 entry becomes a 0 entry), and the graphical indication of binding is turned off 1030. For example, if the graphical indication of binding is a filled in circle at the interface of two binding sites (see 298, 299 in FIG. 2), the filled in circle may be unfilled.

There are many applications of the icon binding and clustering. For example, they may be used to visually consolidate icons in different categories on user's screen (e.g., icons representing system programs, user programs, and graphics programs may be separately bound.)

Consider a TV home shopping system where icons representing related icons (clothing: shoes, shirts, pants) may be bound together. Dragging the cluster of icons to an ordering icon may place simultaneous orders. In a TV movie distribution system, all order for multiple movies represented by icons, could be made by dragging and dropping a cluster on top of a graphical representation of an order form.

The icon binding and clustering methods can be used by application builders when creating layouts for various components (e.g. icons and text fields) of a software application. Once a layout is established, the components may be locked in place; that is, the components cannot be broken apart without supplying a password or having access to a desticking icon which itself requires a password. In this example, the various icons of a software application may be part of a cluster of stuck icons. (See FIG. 3 for sample layouts.)

Unauthorized movement of icons and other graphical objects can be controlled using these methods. For example, adults (or teachers) may prevent children from altering GUI layouts. GUI components on kiosks in museums may also be locked. Also, custom pull-down menus may be built using these methods. For example, unauthorized movement is prevented because GUI objects can be stuck to one another or to storage racks forming a boarder around the display.

The current sticky icons, windows, and "velcro storage racks" can be used to create a temporary pairing or grouping of other graphic elements, such as icons. Like velcro, they provide an easy, reversible way to join two or more objects together. Of course the velcro storage rack can have various shapes. For example, an area of the GUI can include a fuzzy line or spiral that represents a "spool" of joining "velcro material" with sticky sites. To group two icons together, the user can "drag" a length of material from the spool area (for example, by selecting and holding down a mouse button) to any icons with sticky sites. Icons may be stuck to the velcro as described previously in this invention.

Grouped icons maintain their original individual functions, and call still be clicked on individually. However, when the icons are moved (either manually by the user or by an automatic icon arrangement or sorting function), the grouped icons always remain adjacent in the arrangement created. This assures the user that no matter how he or his software determine to arrange the icons in a given folder or desktop, the grouped icons will always be in close proximity to one another, and in the same spatial relationship to one another.

To ungroup, i.e., unstick or release, icons from the group, the user can select and click on the joining velcro element holding the target icon in the group, and the joining strip "dissolves" leaving the icon free to be moved or sorted individually. In a 3-dimensional GUI or Virtual-Reality interface, application or removal of the joining element, and movement of the graphic elements to be grouped, may be done by direct manipulation (i.e. data glove) rather than mouse movements.

Given this disclosure alternative equivalent embodiments would become apparent to one skilled in the art. These embodiments are also within the contemplation of the inventors.

We claim:

1. A computer system with a computer memory and a central processing unit, comprising:

a graphical user interface;

two or more graphical objects displayed on the graphical user interface, two or more of the graphical objects being sticky objects having bonding sites, two or more of the sticky objects bound together to form a cluster when the sticky objects come within a threshold distance one another of on the graphical user interface, and the sticky objects in the cluster moving together as a single graphical object.

2. A computer system, as in claim 1, where the graphical objects include any one or more of: icons, windows, root windows, and virtual reality objects.

3. A computer system, as in claim 1, where there is a visual change on the graphical user interface to indicate that two or more sticky objects are bound together.

4. A computer system, as in claim 1, where the cluster is in any one of the following shapes: a block, an edge, a zig-zag, and a bounding region.

5. A computer system, as in claim 1, where the bonding is initiated by a user input.

6. A computer system, as in claim 1, where the bonding requires a user password.

7. A computer system, as in claim 1, where the graphical objects in the cluster have one or more common characteristics.

8. A computer system, as in claim 1, where the graphical objects in the cluster have one or more relationships.

9. A computer system, as in claim 1, where one or more of the bonding sites are in an interior part of the graphical object.

10. A computer system, as in claim 1, where one or more of the graphical objects becomes unbonded.

11. A computer system, as in claim 10, where one or more of the graphical objects becomes unbonded by a user input.

12. A computer system, where the computer memory and a central processing unit, comprising:

a graphical user interface;

two or more graphical objects for being displayed on the graphical user interface, two or more of the graphical objects being sticky objects having bonding sites; and a cluster binding together two or more sticky objects when the sticky objects come within a threshold distance of one another of the graphical user interface, and the sticky objects in the cluster moving together as a single graphical object.

13. A method of organizing two or more graphical objects on a computer graphical user interface, comprising the steps of:

selecting one or more of the graphical objects to be a selected graphical object;

moving the selected graphical object to a new location;

determining that the new location is within a threshold distance of a second graphical object; and visually indicating the binding of the selected graphical object to the second graphical object to form an object cluster when the selected graphical object is within the threshold distance.

14. A computer system, as in claim 1, where a subset of the graphical objects being one or more of the sticky objects are placed by one or more naked sticky sites, the naked sticky sites being not associated with any graphical object on the display.

* * * * *